(12) United States Patent
Hock (10) Patent No.: US 12,211,648 B2
(45) Date of Patent: Jan. 28, 2025

(54) ULTRACAPACITOR ASSEMBLY

(71) Applicant: Kyocera AVX Components Corporation, Fountain Inn, SC (US)

(72) Inventor: Joseph M. Hock, Surfside Beach, SC (US)

(73) Assignee: Kyocera AVX Components Corporation, Fountain Inn, SC (US)

(*) Notice: Subject to any disclaimer, the term of this patent is extended or adjusted under 35 U.S.C. 154(b) by 674 days.

(21) Appl. No.: 17/330,624

(22) Filed: May 26, 2021

(65) Prior Publication Data

US 2021/0375557 A1 Dec. 2, 2021

Related U.S. Application Data

(60) Provisional application No. 63/033,400, filed on Jun. 2, 2020.

(51) Int. Cl.
| | |
|---|---|
| *H01G 11/08* | (2013.01) |
| *H02J 7/34* | (2006.01) |
| *H01G 11/82* | (2013.01) |

(52) U.S. Cl.
CPC ............. *H01G 11/08* (2013.01); *H02J 7/345* (2013.01); *H01G 11/82* (2013.01)

(58) Field of Classification Search
CPC ........................................................ H02J 7/345
USPC ........................................................ 320/166
See application file for complete search history.

(56) References Cited

U.S. PATENT DOCUMENTS

| | | | |
|---|---|---|---|
| 6,480,368 | B1 | 11/2002 | Lammers et al. |
| 6,806,686 | B1 | 10/2004 | Thrap |
| 7,342,768 | B2 | 3/2008 | Doljack et al. |
| 7,345,454 | B2 | 3/2008 | Thrap |
| 7,457,100 | B2 | 11/2008 | Nakajima et al. |

(Continued)

FOREIGN PATENT DOCUMENTS

| | | |
|---|---|---|
| JP | 5304654 | 10/2013 |
| JP | 2015186331 | 10/2015 |

(Continued)

OTHER PUBLICATIONS

International Search Report and Written Opinion for PCT/US/2021/034193 dated Sep. 15, 2021, 7 pages.

*Primary Examiner* — Yalkew Fantu (74) *Attorney, Agent, or Firm* — Dority & Manning, P.A.

(57) ABSTRACT

An ultracapacitor assembly is provided. The ultracapacitor assembly includes a plurality of ultracapacitors. The ultracapacitor assembly further includes a first bus bar and a second bus bar. The second bus bar is spaced apart from the first bus bar. The ultracapacitor assembly includes a discharge resistor coupled between the first bus bar and the second bus bar. The ultracapacitor assembly further includes a first plurality of switching devices and a second plurality of switching devices. Each switching device in the first plurality of switching devices is coupled between the first bus bar and a corresponding ultracapacitor of the plurality of ultracapacitors to selectively couple the corresponding ultracapacitor the discharge resistor via the first bus bar. Each switching device in the second plurality of switching devices is coupled between the second bus bar and a corresponding ultracapacitor to selectively couple the corresponding ultracapacitor the discharge resistor via the second bus bar.

15 Claims, 5 Drawing Sheets

(56) References Cited

U.S. PATENT DOCUMENTS

| | | | |
|---|---|---|---|
| 7,482,816 | B2 | 1/2009 | Odajima et al. |
| 7,531,987 | B2 | 5/2009 | Ohasi et al. |
| 7,599,167 | B2 | 10/2009 | Doljack |
| 7,599,168 | B2 | 10/2009 | Doljack et al. |
| 7,647,191 | B2 | 1/2010 | Kakiuchi et al. |
| 7,660,084 | B2 | 2/2010 | Kim et al. |
| 7,880,449 | B2 | 2/2011 | Thrap |
| 8,134,337 | B2 | 3/2012 | Morita |
| 8,198,870 | B2 | 6/2012 | Zuercher |
| 8,305,035 | B2 | 11/2012 | Morita et al. |
| 8,463,562 | B2 | 6/2013 | Nakanishi |
| 8,686,662 | B1 | 4/2014 | Bragg et al. |
| 9,018,922 | B2 | 4/2015 | Morita et al. |
| 9,190,860 | B2 | 11/2015 | Wright et al. |
| 9,209,653 | B2 | 12/2015 | Maynard et al. |
| 10,879,720 | B2 | 12/2020 | Hock |
| 10,903,663 | B2 | 1/2021 | Hock |
| 2009/0231764 | A1 | 9/2009 | Banting et al. |
| 2010/0039072 | A1* | 2/2010 | Cegnar ............... H01G 11/10 320/167 |
| 2014/0114592 | A1 | 4/2014 | Eilertsen |
| 2014/0266050 | A1 | 9/2014 | Biskup |
| 2015/0340886 | A1 | 11/2015 | Sung et al. |
| 2016/0243960 | A1 | 8/2016 | Wood et al. |
| 2016/0301221 | A1 | 10/2016 | Kaminsky |
| 2018/0205240 | A1* | 7/2018 | Sadilek ............... H02M 7/4835 |
| 2018/0375345 | A1* | 12/2018 | Altemose ............ H02J 7/0019 |
| 2020/0153262 | A1 | 5/2020 | Yoon |

FOREIGN PATENT DOCUMENTS

| | | |
|---|---|---|
| JP | 6584798 | 10/2019 |
| KR | 100733394 | 6/2007 |
| KR | 100998661 | 12/2010 |
| WO | WO2009118119 | 10/2009 |
| WO | WO2009118120 | 10/2009 |

* cited by examiner

ULTRACAPACITOR ASSEMBLY

PRIORITY CLAIM

This application claims the benefit of priority of U.S. Provisional Patent Application Ser. No. 63/033,400, filed on Jun. 2, 2020, titled "Ultracapacitor Assembly," which is incorporated herein by reference.

BACKGROUND

Electrical energy storage cells are widely used to provide power to electronic, electromechanical, electrochemical, and other useful devices. A double layer ultracapacitor, for instance, can employ a pair of polarizable electrodes that contain carbon particles (e.g., activated carbon) impregnated with a liquid electrolyte. Due to the effective surface area of the particles and the small spacing between the electrodes, large capacitance values can be achieved. The individual double layer capacitors may be combined together to form a module having a raised output voltage or increased energy capacity.

SUMMARY

One aspect of the present disclosure is directed to an ultracapacitor. The ultracapacitor assembly includes a plurality of ultracapacitors. The ultracapacitor assembly further includes a first bus bar and a second bus bar. The second bus bar is spaced apart from the first bus bar. The ultracapacitor assembly includes a discharge resistor coupled between the first bus bar and the second bus bar. The ultracapacitor assembly further includes a first plurality of switching devices and a second plurality of switching devices. Each switching device in the first plurality of switching devices is coupled between the first bus bar and a corresponding ultracapacitor of the plurality of ultracapacitors to selectively couple the corresponding ultracapacitor the discharge resistor via the first bus bar. Each switching device in the second plurality of switching devices is coupled between the second bus bar and a corresponding ultracapacitor to selectively couple the corresponding ultracapacitor the discharge resistor via the second bus bar.

Another aspect of the present disclosure is directed to a method of discharging one or more ultracapacitors. The method includes controlling operation of a first switching device to couple one or more ultracapacitors to a discharge resistor via a first bus bar. The method further includes controlling operation of a second switching device to couple the one or more ultracapacitors to the discharge resistor via a second bus bar that is spaced apart from the first bus bar. The method even further includes providing a current from the one or more ultracapacitors to the discharge resistor when the one or more ultracapacitors are coupled to the discharge resistor via the first bus bar and the second bus bar.

Other features and aspects of the present disclosure are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figure in which.

Repeat use of reference characters in the present specification and drawing is intended to represent same or analogous features or elements of the disclosure.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present disclosure, which broader aspects are embodied in the exemplary construction.

Example aspects of the present disclosure are directed to an ultracapacitor assembly. The ultracapacitor assembly can include a plurality of ultracapacitors. The ultracapacitor assembly can further include a first bus bar and a second bus bar. The second bus bar can be spaced apart from the first bus bar. More specifically, the second bus bar can be spaced apart from the first bus bar such that the plurality of ultracapacitors are positioned between the first bus bar and the second bus bar. The ultracapacitor assembly can include a discharge resistor coupled between the first bus bar and the second bus bar. For instance, in some implementations, the discharge resistor can be coupled to the first bus bar and the second bus bar via one or more conductors (e.g., wires).

The ultracapacitor assembly can include a first plurality of switching devices and a second plurality of switching devices. Each switching device in the first plurality of switching devices can be coupled between the first bus bar and a corresponding ultracapacitor of the plurality of ultracapacitors to selectively couple the corresponding ultracapacitor to the discharge resistor. Furthermore, each switching device in the second plurality of switching devices can be coupled between the second bus bar and a corresponding ultracapacitor of the plurality of ultracapacitors to selectively couple the corresponding ultracapacitor to the discharge resistor. When one or more of the plurality of ultracapacitors is coupled to the first bus bar and the second bus bar, the one or more ultracapacitors can be coupled to the discharge resistor. In this manner, the one or more ultracapacitors can provide a discharge current to the discharge resistor when the one or more ultracapacitors are coupled to the first bus bar and the second bus bar via a switching device in the first plurality of switching devices and a switching device in the second plurality of switching devices, respectively.

A combined total number of switching devices in the first plurality of switching devices and the second plurality of switching devices can be greater than a total number of ultracapacitors. Furthermore, a total number of switching devices in the first plurality of switching devices can be the same as a total number of switching devices in the second plurality of switching devices. In some implementations, each switching device in the first plurality of switching devices and each switching device in the second plurality of switching devices can include a field effect transistor or other suitable switching device (e.g., semiconductor switching device). It should be appreciated, however, that any suitable type of switching device can be used to selectively couple an ultracapacitor to the first bus bar and the second bus bar.

The ultracapacitor assembly according to the present disclosure provides numerous technical effects and benefits. For instance, the first plurality of switching devices and the second plurality of switching devices can allow one or more of the ultracapacitors to be coupled to a common discharge resistor. In this manner, more than one ultracapacitor of the ultracapacitor assembly can be balanced and/or selectively discharged at a time without requiring multiple discharge resistors. Furthermore, wiring associated with the ultracapacitor assembly can be reduced since more than one of the plurality of ultracapacitors can be balanced and/or discharged using the common discharge resistor.

Figure 1:
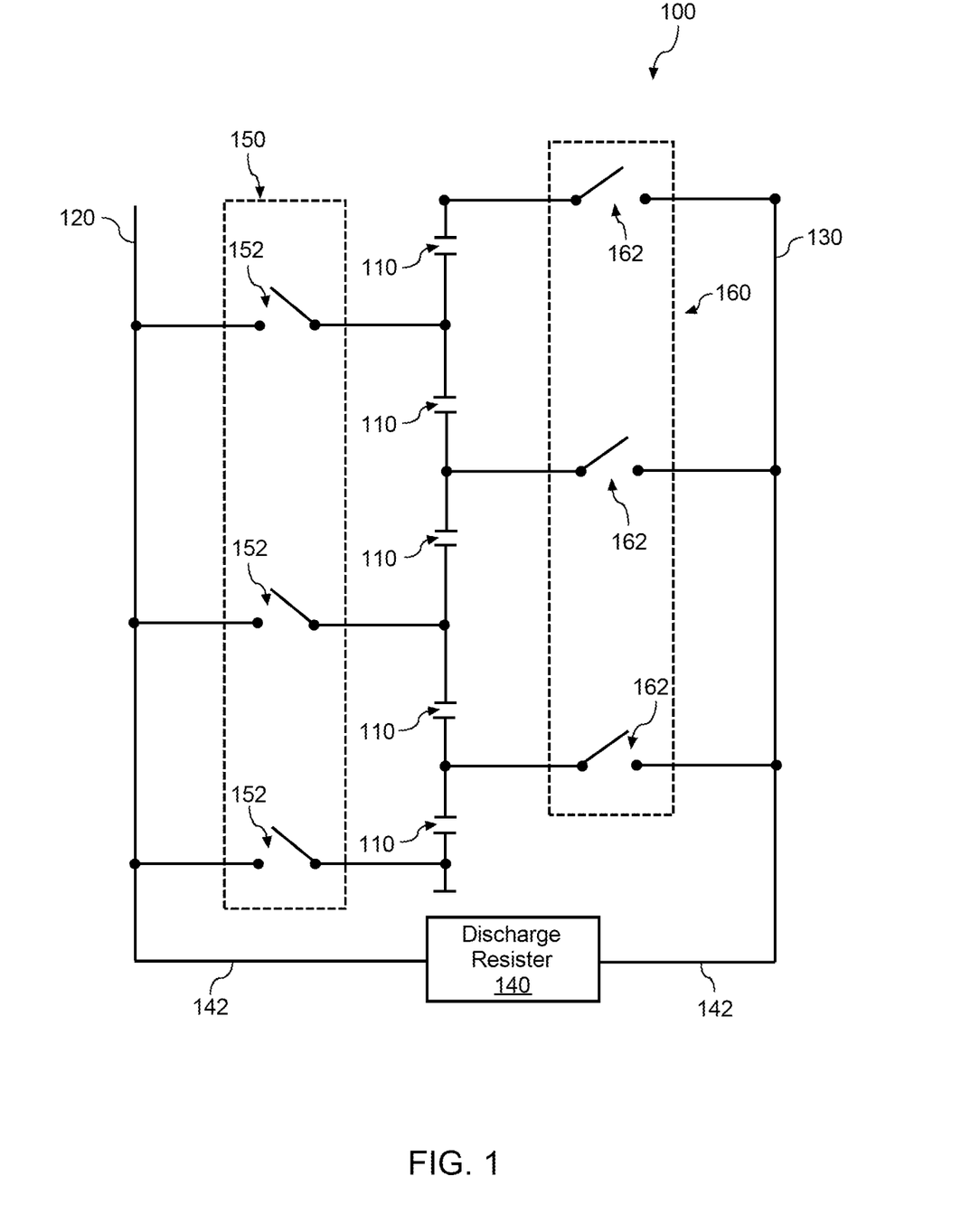
FIG. 1 depicts an ultracapacitor assembly according to example embodiments of the present disclosure.
Figure 2:
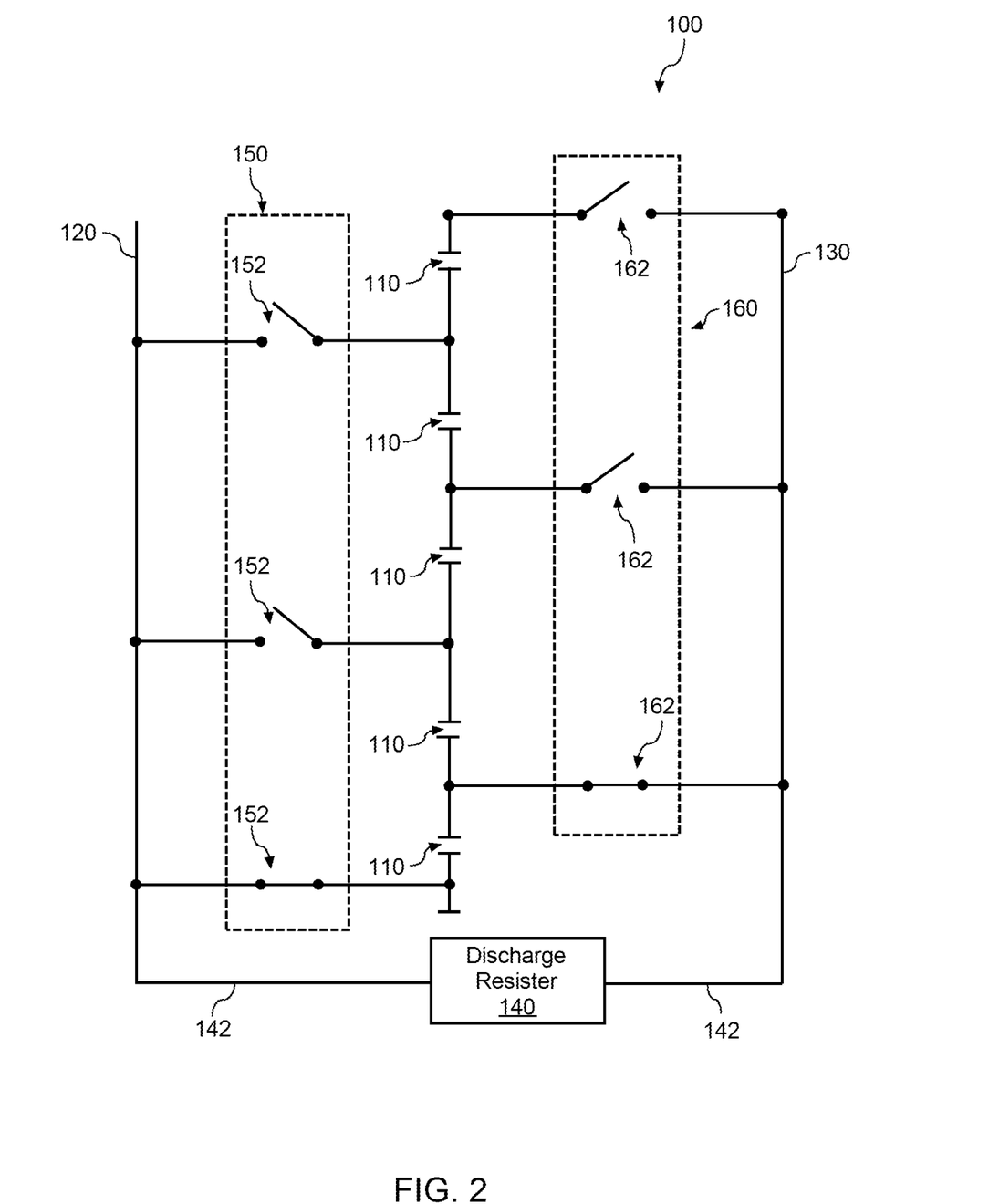
FIG. 2 depicts a single ultracapacitor coupled to a discharge resistor of an ultracapacitor assembly according to example embodiments of the present disclosure.
Figure 3:
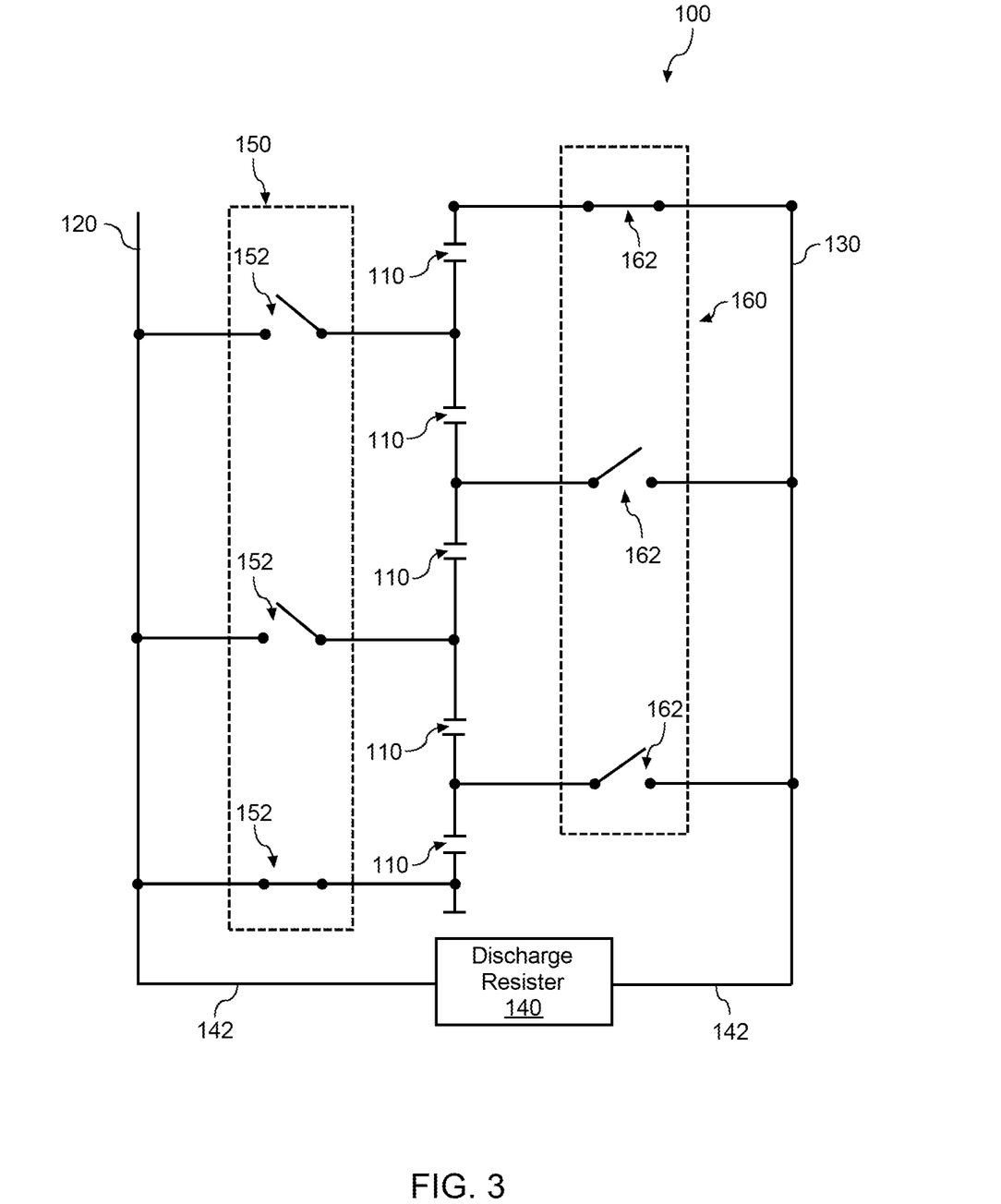
FIG. 3 depicts a plurality of ultracapacitors coupled to a discharge resistor of an ultracapacitor assembly according to example embodiments of the present disclosure.

Referring now to the FIGS., FIGS. 1-3 depicts an ultracapacitor assembly 100 according to example embodiments of the present disclosure. As shown, the ultracapacitor assembly 100 can include a plurality of ultracapacitors 110. In addition, the ultracapacitor assembly 100 can include a first bus bar 120 and a second bus bar 130. The second bus bar 130 can be spaced apart from the first bus bar 120. More specifically, the second bus bar 130 can be spaced apart from the first bus bar 120 such that the plurality of ultracapacitors 110 are positioned between the first bus bar 120 and the second bus bar 130. The ultracapacitor assembly 100 can also include a discharge resistor 140 coupled between the first bus bar 120 and the second bus bar 130. For instance, in some implementations, the discharge resistor 140 can be coupled to the first bus bar 120 and the second bus bar 130 via one or more conductors 142 (e.g., wires).

The ultracapacitor assembly 100 can include a first plurality 150 of switching devices 152 and a second plurality 160 of switching devices 162. Each switching device in the first plurality 150 of switching devices 152 can be coupled between the first bus bar 120 and a corresponding ultracapacitor of the plurality of ultracapacitors 110 to selectively couple the corresponding ultracapacitor to the discharge resistor 140 via the first bus bar 120. Furthermore, each switching device in the second plurality 160 of switching devices 162 can be coupled between the second bus bar 130 and a corresponding ultracapacitor of the plurality of ultracapacitors 110 to selectively couple the corresponding ultracapacitor to the discharge resistor 140 via the second bus bar 130. When one or more of the plurality of ultracapacitors 110 is coupled to the discharge resistor 140 via a switching device 152 in the first plurality 150 of switching devices 152 and a switching device 162 in the second plurality 160 of switching devices 162, the one or more ultracapacitors can provide a discharge current to the discharge resistor 140.

As shown, a combined total number of switching devices 152, 162 in the first plurality 150 of switching devices 152 and the second plurality 160 of switching devices 162 can be greater than a total number of ultracapacitors 110. For instance, as may be seen in FIG. 1, the combined total number of switching devices 152, 162 in the ultracapacitor assembly 100 is six, whereas the total number of ultracapacitors 110 is five. Furthermore, a total number of switching devices 152 in the first plurality 150 of switching device 152 can be the same as a total number of switching devices 162 in the second plurality 160 of switching devices 162. In some implementations, each switching device in the first plurality 150 of switching devices 152 and the second plurality 160 of switching devices 162 can include a field effect transistor. It should be appreciated, however, that the switching devices 152, 162 can include any suitable type of switching device configured to selectively couple one or more of the plurality of ultracapacitors 110 to the discharge resistor 140 via the first bus bar 120 and the second bus bar 130, respectively.

As shown, the first plurality 150 of switching devices 152 and the second plurality 160 of switching devices 162 can be configurable in a first state or configuration (FIG. 1) and a second state or configuration (FIGS. 2 and 3) that is different than the first configuration. When the first plurality 150 of switching devices 152 are in the first configuration, the plurality of ultracapacitors 110 are decoupled from the first bus bar 120. Likewise, the plurality of ultracapacitors 110 are decoupled from the second bus bar 130 when the second plurality 160 of switching devices 162 are in the first configuration. In this manner, the plurality of ultracapacitors 110 can be decoupled from the discharge resistor 140 when both the first plurality 150 of switching devices 152 and the second plurality 160 of switching devices 162 are in the first configuration.

Conversely, one or more of plurality of ultracapacitors 110 can be coupled to the discharge resistor 140 when a switching device 152 in the first plurality 150 of switching devices 152 is in the second configuration (FIGS. 2 and 3) and a switching device 162 in the second plurality 160 of switching devices 162 is in the second configuration. More specifically, the one or more ultracapacitors can be coupled to the discharge resistor 140 in a series configuration when the switching device 152 in the first plurality 150 of switching devices 152 and the switching device 162 in the second plurality 160 of switching devices 162 are both in the second configuration (FIGS. 2 and 3). In this manner, the one or more ultracapacitors can be balanced (e.g., selectively discharged) via the discharge resistor 140. More specifically, the one or more ultracapacitors can provide a current to the discharge resistor 140.

As shown in FIGS. 2 and 3, any suitable number of ultracapacitors can be coupled to the discharge resistor 140 via the first plurality 150 of switching devices 152 and the second plurality 160 of switching devices 162. For example, the first plurality 150 of switching devices 152 and the second plurality 160 of switching devices 162 can be controlled such that only one of the plurality of ultracapacitors 110 is coupled to the discharge resistor 140 at a time as shown in FIG. 2. Alternatively, as shown in FIG. 3, the first plurality 150 of switching devices 152 and the second plurality 160 of switching devices 162 can be controlled such that multiple ultracapacitors can be coupled to the discharge resistor 140 at the same time. For instance, in some implementations, the first plurality 150 of switching devices 152 and the second plurality 160 of switching devices 162 can be controlled such that each of the plurality of ultracapacitors 110 can be coupled to the discharge resistor 140 at the same time. In such implementations, each of the plurality of ultracapacitors 110 can be balanced (e.g., discharged) concurrently without requiring a separate discharge resistor for each of the plurality of ultracapacitors 110.

Figure 4:
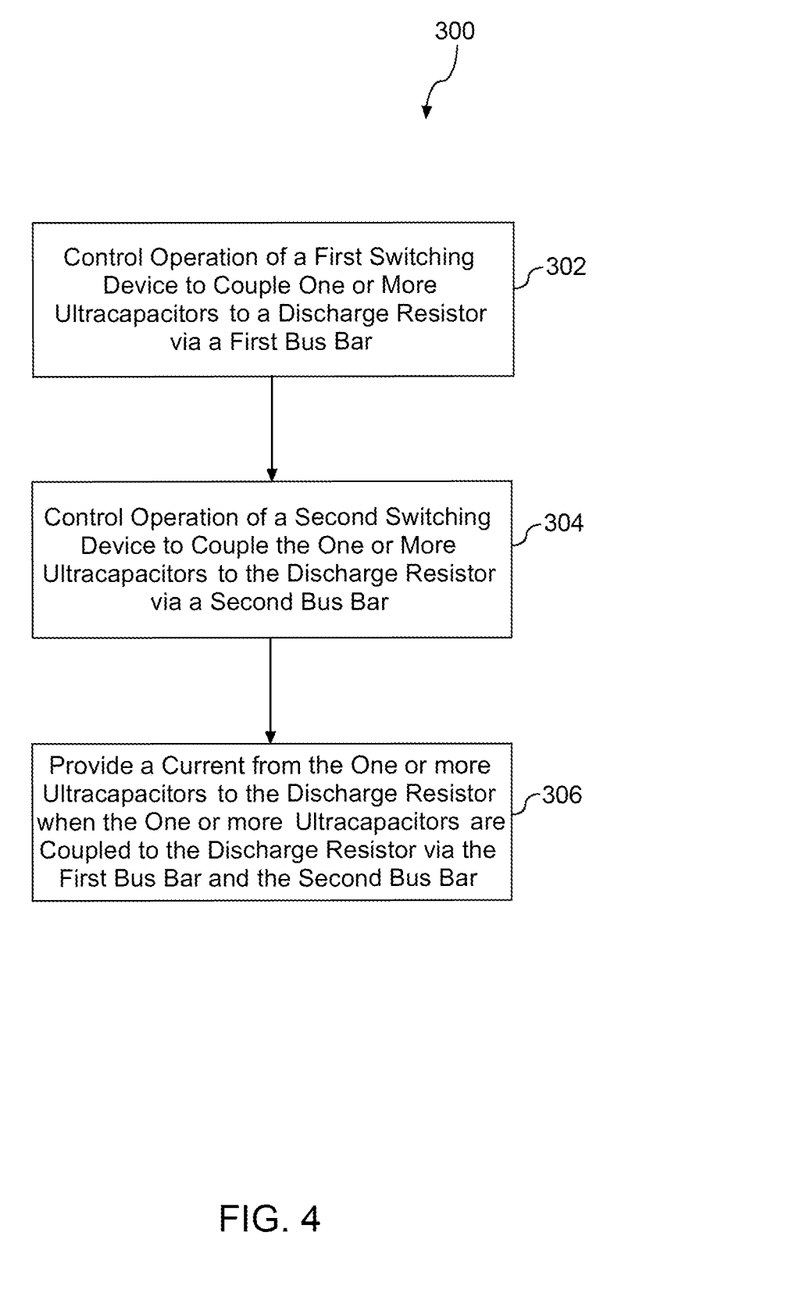
FIG. 4 depicts a flow diagram of an example method for balancing one or more ultracapacitors of an ultracapacitor assembly according to example embodiments of the present disclosure.

FIG. 4 depicts a flow diagram of a method 300 according to example embodiments of the present disclosure. The method 300 can be implemented, for instance, using the ultracapacitor assembly depicted in FIG. 1. FIG. 4 depicts steps performed in a particular order for purposes of illustration and discussion. Those of ordinary skill in the art, using the disclosures provided herein, will understand that various steps of any of the methods disclosed herein can be omitted, rearranged, performed simultaneously, expanded, modified, and/or adapted in various ways without deviating from the scope of the present disclosure.

At (302), the method 300 can include controlling operation of a first switching device to couple one or more ultracapacitors to a discharge resistor via a first bus bar. For instance, controlling operation of the first switching device can include providing one or more control signals associated with coupling an ultracapacitor to the discharge resistor via the first bus bar.

At (304), the method 300 can include controlling operation of a second switching device to couple the one or more ultracapacitors to the discharge resistor via a second bus bar that is spaced apart from the first bus bar. For instance, controlling operation of the second switching device can include providing one or more control signals associated with coupling an ultracapacitor to the discharge resistor via the second bus bar. In some implementations, the ultracapacitor coupled to the discharge resistor via the second bus bar can be the same as the ultracapacitor coupled to the discharge resistor via the first bus bar at (302). In alternative implementations, the ultracapacitor coupled to the discharge resistor via the second bus bar can be different than the ultracapacitor coupled to the discharge resistor via the first bus bar. In such implementations, the two different ultracapacitors (e.g., first ultracapacitor, second ultracapacitor) can be coupled to one another in a series configuration. In this manner, both ultracapacitors can be coupled to the discharge resistor.

At (306), the method 300 can include providing a current from the one or more ultracapacitors to the discharge resistor when the one or more ultracapacitors are coupled to the discharge resistor via the first bus bar and the second bus bar. In some implementations, the ultracapacitors can be coupled to one another in a series configuration. In such implementations, multiple ultracapacitors can be coupled to the discharge resistor at a time. In this manner, each ultracapacitor that is coupled to the discharge resistor via the first bus bar and the second bus can provide a current to the discharge resistor. As such, multiple ultracapacitors can be balanced (e.g., discharged) at a time without requiring a separate discharge resistor for each of the ultracapacitors.

Figure 5:
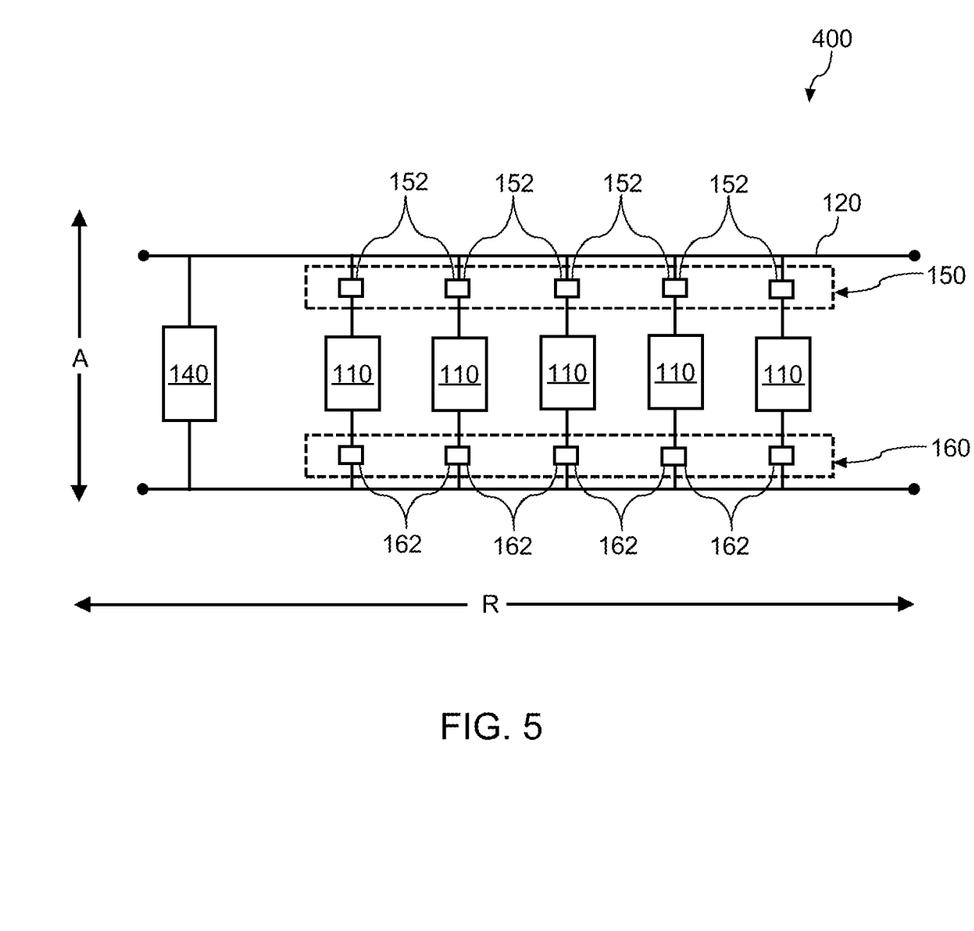
FIG. 5 depicts a spatial arrangement of components of an ultracapacitor assembly according to example embodiments of the present disclosure.

Referring now to FIG. 5, a spatial arrangement of components of an ultracapacitor assembly 400 is provided according to example embodiments of the present disclosure. As shown, the ultracapacitor assembly 400 can include the plurality of ultracapacitors 110 discussed above with reference to FIG. 1. In addition, the ultracapacitor assembly 400 can include the first bus bar 120 and the second bus bar 130. As shown, the second bus bar 130 can be spaced apart from the first bus bar 120 along an axial direction A of the ultracapacitor assembly 400. More specifically, the second bus bar 130 can be spaced apart from the first bus bar 120 along the axial direction A such that the plurality of ultracapacitors 110 are positioned between the first bus bar 120 and the second bus bar 130 along the axial direction A. In some implementations, the plurality of ultracapacitors 110 can be spaced apart from one another along a radial direction R of the ultracapacitor assembly 400.

The ultracapacitor assembly 400 can include the discharge resistor 140 discussed above with reference to FIG. 1. As shown, the discharge resistor 140 can be coupled between the first bus bar 120 and the second bus bar 130. In this manner, the discharge resistor 140 can, like the plurality of ultracapacitors 110, be positioned between the first bus bar 120 and the second bus bar 130 along the axial direction A.

The ultracapacitor assembly 400 can include the first plurality 150 of switching devices 152 and the second plurality 160 of switching devices 162 discussed above with reference to FIGS. 1-3. As shown, each switching device 152 in the first plurality 150 can be coupled between the first bus bar 120 and a corresponding ultracapacitor of the plurality of ultracapacitors 110. In this manner, each switching device 152 in the first plurality 150 can be positioned between the first bus bar 120 and the plurality of ultracapacitors 110 along the axial direction A. Furthermore, each switching device 162 in the second plurality 160 can be coupled between the second bus bar 130 and a corresponding ultracapacitor of the plurality of ultracapacitors 110. In this manner, each switching device 162 in the second plurality 160 can be positioned between the second bus bar 130 and the plurality of ultracapacitors 110 along the axial direction A.

Any of a variety of different individual ultracapacitors may generally be employed in the module according to example aspects of the present disclosure. In some embodiments, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present disclosure. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In some embodiments, at least one of the first and second current collectors, and preferably both, may also contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). In general, the plurality of whiskers project outwardly from a substrate. If desired, the whiskers may optionally project from a seed portion that is embedded within the substrate, Similar to the whiskers, the seed portion may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary. For example, the electrodes and separator may be initially folded, wound, stacked, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctane-sulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present disclosure. The metal container may have any of a variety of different shapes, such as cylindrical, D-shaped, etc. Cylindrically-shaped containers are particular suitable.

In another embodiment, for example, the housing may be in the form of a flexible package that encloses the components of the ultracapacitor. The package generally includes a substrate that extends between two ends and has edges wherein the ends, as well as the portions of both sides that overlap, are fixedly and sealingly abutted against one another (e.g., by heat welding). In this manner, the electrolyte can be retained within the package. The substrate typically has a thickness within the range of from about 20 micrometers to about 1,000 micrometers, in some embodiments from about 50 micrometers to about 800 micrometers, and in some embodiments, from about 100 micrometers to about 600 micrometers.

The substrate may contain any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer is positioned between the outer layer and the electrode assembly. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain an inner layer that is positioned between the electrode assembly and the barrier layer. In certain embodiments, the inner layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth)acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Within the module, the manner in which the ultracapacitors are connected may vary. For example, the ultracapacitors may be connected using an interconnect that attaches to or connects the respective terminals of the ultracapacitors. The interconnect may be made of a conductive material, such as a conductive metal. In one embodiment, the interconnect may be relatively flat or may be one having an increased surface area. Regarding the latter, the interconnect may have projections/protrusions or may also be formed from wires, braids, coils, etc. In this regard, the specific dimensions and configuration of the interconnects is not necessarily limited. Regardless of its form, any of a variety of different conductive materials may be employed, such as copper, tin, nickel, aluminum, etc., as well as alloys and/or coated metals. If desired, the conductive material may optionally be insulated with a sheath material.

The ultracapacitors may be electrically connected together in series or in parallel, depending on the particular properties desired. For instance, in one particular embodiment, the ultracapacitors may be electrically connected in series such that a terminal of a certain polarity (e.g., positive) of one ultracapacitor is connected to a terminal of opposite polarity (e.g., negative) of another ultracapacitor. For instance, the positive terminal may extend from a top portion of the first ultracapacitor and the negative terminal may extend from a bottom portion of the second ultracapacitor.

Ultracapacitors and modules containing them can be employed to store large amounts of electrical charge. As a result, the modules and ultracapacitors of the present disclosure can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). They also have a variety of applications in consumer electronics (e.g., portable media players, hand-held devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor assembly, comprising: a first bus bar; a second bus bar spaced apart from the first bus bar; a plurality of ultracapacitors positioned between the first bus bar and the second bus bar; a discharge resistor coupled between the first bus bar and the second bus bar; a first plurality of switching devices, each switching device in the first plurality of switching devices coupled between the first bus bar and a corresponding ultracapacitor of the plurality of ultracapacitors to selectively couple the corresponding ultracapacitor to the discharge resistor via the first bus bar; and a second plurality of switching devices, each switching device in the second plurality of switching devices coupled between the second bus bar and the corresponding ultracapacitor to selectively couple the corresponding ultracapacitor to the discharge resistor via the second bus bar; wherein the first plurality of switching devices and the second plurality of switching devices configurable in a configuration such that the plurality of ultracapacitors is decoupled from the discharge resistor when the first plurality of switching devices and the second plurality of switching devices are in the configuration; wherein the plurality of ultracapacitors are positioned between the first bus bar and the second bus bar along an axial direction, wherein: each switching device in the first plurality of switching devices is positioned between the first bus bar and the plurality of ultracapacitors along the axial direction; and each switching device in the second plurality of switching devices is positioned between the second bus bar and the plurality of ultracapacitors along the axial direction.

2. The ultracapacitor assembly of claim 1, wherein when an ultracapacitor of the plurality of ultracapacitors is coupled to the first bus bar via a switching device in the first plurality of switching devices and when the ultracapacitor is further coupled to the second bus bar via a switching device in the second plurality of switching devices, the ultracapacitor provides a current to the discharge resistor.

3. The ultracapacitor assembly of claim 1, wherein when a first ultracapacitor of the plurality of ultracapacitors is coupled to the first bus bar via a switching device in the first plurality of switching devices and a second ultracapacitor of the plurality of ultracapacitors is coupled to the second bus bar via a switching device in the second plurality of switching devices, at least the first ultracapacitor and the second ultracapacitor are coupled to the discharge resistor.

4. The ultracapacitor assembly of claim 3, wherein each of the plurality of ultracapacitors is coupled to the discharge resistor via the first bus bar and the second bus bar.

5. The ultracapacitor assembly of claim 1, wherein a combined total number of switching devices in the first plurality of switching devices and the second plurality of switching devices is greater than a total number of ultracapacitors.

6. The ultracapacitor assembly of claim 1, wherein a total number of switching devices in the first plurality of switching devices is the same as a total number of switching devices in the second plurality of switching devices.

7. The ultracapacitor assembly of claim 1, wherein each switching device in the first plurality of switching devices and each switching device in the second plurality of switching devices comprise a field effect transistor.

8. The ultracapacitor assembly of claim 1, wherein the discharge resistor is coupled between the first bus bar and the second bus bar via one or more conductors.

9. The ultracapacitor assembly of claim 1, wherein the second bus bar is spaced apart from the first bus bar along the axial direction.

10. The ultracapacitor assembly of claim 1, wherein the plurality of ultracapacitors are spaced apart from one another along a radial direction.

11. A method of discharging one or more ultracapacitors, the method comprising: controlling operation of a first switching device to couple one or more ultracapacitors to a discharge resistor via a first bus bar; controlling operation of a second switching device to couple the one or more ultracapacitors to the discharge resistor via a second bus bar that is spaced apart from the first bus bar; and providing a current from the one or more ultracapacitors to the discharge resistor when the one or more ultracapacitors are coupled to the discharge resistor via the first bus bar and the second bus bar; wherein the one or more ultracapacitors positioned between the first bus bar and the second bus bar; the discharge resistor coupled between the first bus bar and the second bus bar; and wherein the first switching device and the second switching device configurable in a configuration such that the one or more ultracapacitors is decoupled from the discharge resistor when the first switching device and the second switching device are in the configuration; wherein: controlling operation of the first switching device comprises providing one or more control signals to couple a first ultracapacitor to the discharge resistor via the first bus bar; and controlling operation of the second switching device comprises providing one or more control signals to couple a second ultracapacitor to the discharge resistor via the second bus bar, the second ultracapacitor being coupled to the first ultracapacitor in a series configuration, and providing a current from the one or more ultracapacitors to the discharge resistor comprises: providing a first current from the first ultracapacitor to the discharge resistor; and providing a second current from the second ultracapacitor to the discharge resistor.

12. The method of claim 11, wherein:
controlling operation of the first switching device comprises providing one or more control signals associated with coupling an ultracapacitor to the discharge resistor via the first bus bar; and
controlling operation of the second switching device comprises providing one or more control signals associated with coupling the ultracapacitor to the discharge resistor via the second bus bar.

13. The method of claim 11, wherein the first switching device and the second switching device each comprise a field effect transistor.

14. The method of claim 11, wherein the first bus bar and the second bus bar are spaced apart along an axial direction.

15. The method of claim 14, wherein the one or more ultracapacitors are positioned between the first bus bar and the second bus bar along an axial direction.

* * * * *